US011238744B2

(12) United States Patent
Williams et al.

(10) Patent No.: US 11,238,744 B2
(45) Date of Patent: Feb. 1, 2022

(54) METHOD AND SYSTEM FOR CONTROLLING INTERVAL MANAGEMENT OF AN AIRCRAFT

(71) Applicant: GE Aviation Systems LLC, Grand Rapids, MI (US)

(72) Inventors: Terry Lee Williams, Freeport, MI (US); Andrew Douglas Gent, East Grand Rapids, MI (US); Joachim Karl Ulf Hochwarth, Caledonia, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 119 days.

(21) Appl. No.: 16/454,583

(22) Filed: Jun. 27, 2019

(65) Prior Publication Data
US 2020/0410871 A1    Dec. 31, 2020

(51) Int. Cl.
*G08G 5/00* (2006.01)

(52) U.S. Cl.
CPC ........... *G08G 5/0017* (2013.01); *G08G 5/003* (2013.01)

(58) Field of Classification Search
CPC ...... G08G 5/0017; G08G 5/003; G08G 1/205; G08G 7/00; G08G 5/0021; G08G 5/0026; G08G 5/0034; G08G 5/0039; G08G 5/0043; G08G 5/0047; G08G 5/0069; G08G 5/0078; G08G 5/0095; G08G 5/025; B60R 2021/0027; G08B 25/016; G08B 25/08; G07C 5/008; G07C 5/085; G07C 5/0808; B60W 40/10; H04W 4/90; B64C 2201/00; B64C 2201/02; B64C 2201/021; B64C 2201/14; B64C 2201/143; B64C 2201/145; B64C 2201/146; B64C 2201/20; G05D 1/00; G01C 21/00; G01C 21/02; G01C 21/04; G01C 21/10; G01C 21/28; G01C 21/34; G01C 21/36

USPC ................................................ 701/121, 32.2
See application file for complete search history.

(56) References Cited

U.S. PATENT DOCUMENTS

| | | | |
|---|---|---|---|
| 7,412,324 B1 * | 8/2008 | Bagge ................... | G01C 23/00 340/948 |
| 7,606,115 B1 | 10/2009 | Cline et al. | |
| 8,386,158 B2 * | 2/2013 | Blanchon ............. | G08G 5/0021 701/120 |
| 8,935,016 B2 | 1/2015 | Raynaud et al. | |
| 9,142,133 B2 | 9/2015 | Palanisamy et al. | |
| 9,224,302 B1 | 12/2015 | Young et al. | |
| 9,355,566 B2 | 5/2016 | Garrido-Lopez et al. | |
| 10,192,450 B2 | 1/2019 | Adler et al. | |
| 2003/0193408 A1 * | 10/2003 | Brown ................. | G08G 5/0021 340/945 |
| 2012/0035841 A1 | 2/2012 | Polansky et al. | |
| 2012/0179368 A1 | 7/2012 | Walter | |
| 2017/0337829 A1 | 11/2017 | Brandao et al. | |
| 2019/0019422 A1 | 1/2019 | Khatwa et al. | |

* cited by examiner

*Primary Examiner* — Anthony R Jimenez
(74) *Attorney, Agent, or Firm* — McGarry Bair PC

(57) ABSTRACT

An aircraft and method for controlling a following aircraft in reference to a target aircraft including receiving, in a flight management system of the following aircraft, information related to the target aircraft, setting a required time of arrival at an achieve-by-point abeam of the target aircraft target reference point, and after the achieve-by-point is reached, flying the following aircraft to maintain a fixed separation until a defined termination point has been reached.

20 Claims, 5 Drawing Sheets

METHOD AND SYSTEM FOR CONTROLLING INTERVAL MANAGEMENT OF AN AIRCRAFT

BACKGROUND

In an effort for airspace modernization, air traffic management is being modernized to leverage emerging technologies and aircraft navigation capabilities. Aircraft can exploit high accuracy provided by Global Navigation Satellite System (GNSS) and Global Positioning System (GPS)-based navigation systems, modern Flight Management Systems (FMSs) and Flight Control Systems (FCSs).

BRIEF DESCRIPTION

The disclosure relates to controlling a following aircraft in reference to a target aircraft, the method including receiving, in a flight management system of the following aircraft, information related to the target aircraft, setting a required time of arrival at an achieve-by-point abeam of the target aircraft target reference point, and after the achieve-by-point is reached, flying the following aircraft to maintain a fixed separation between the following aircraft and the target aircraft.

In another aspect, the disclosure relates to an aircraft, including a communication link, and a flight management system that is communicably coupled to the communication link, and includes an interval management module configured to receive information related to a target aircraft and automatically achieve an initial separation with a target aircraft and maintain a predetermined separation with the target aircraft until a target reference point is reached.

DETAILED DESCRIPTION

Figure 1:
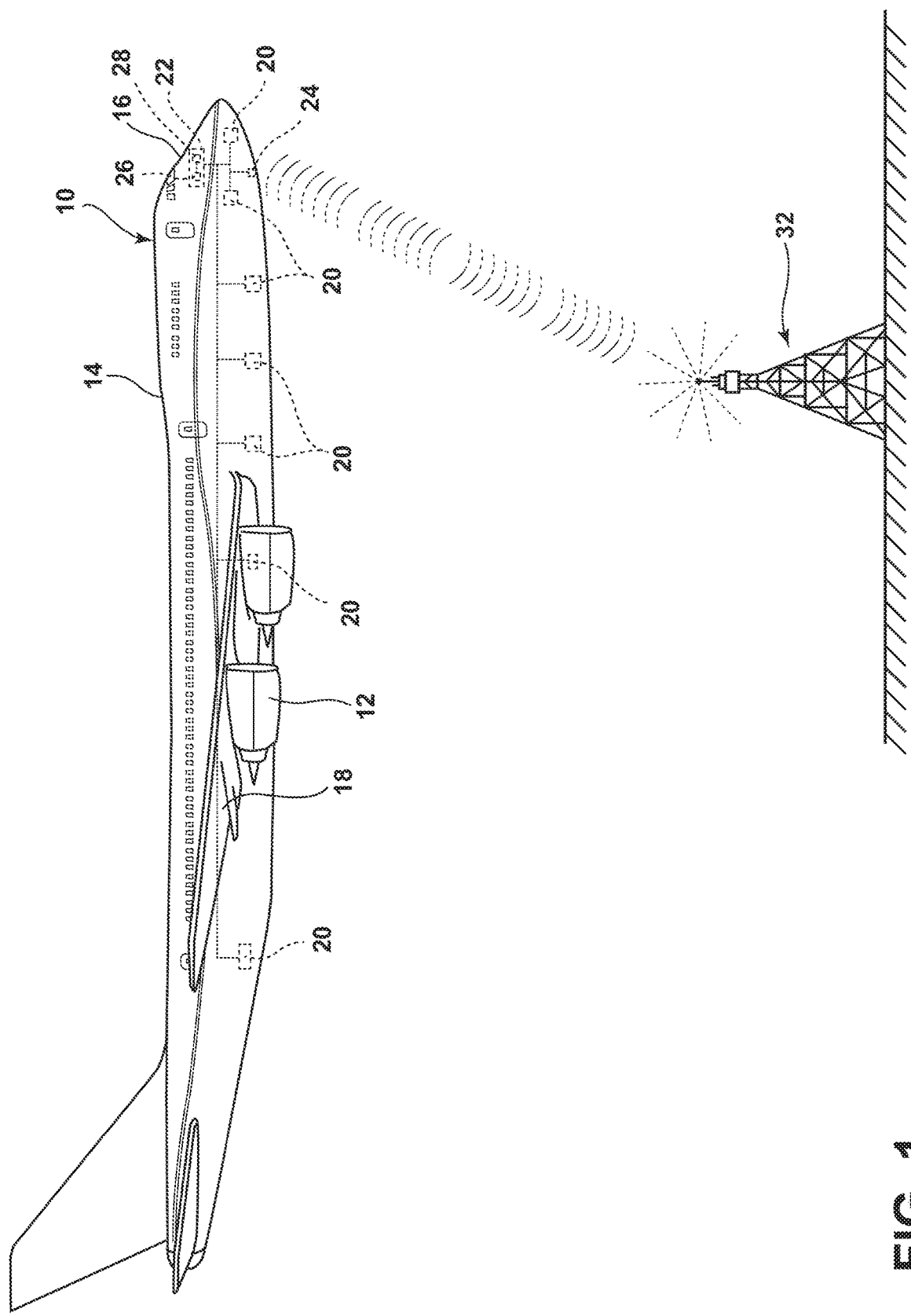
FIG. 1 is a schematic illustration of an aircraft and ground system according to aspects described herein.

Aspects of the present disclosure relate to providing Advanced Interval Management (AIM) functions, for use in the Next Generation airspace. More specifically, aircraft and FMS of the present disclosure allow for guidance to the aircraft to both initially achieve the ATC requested distance or time separation such as in an initial "achieve-by" stage and then maintain that separation in a "maintain stage". For AIM functions there is the lead aircraft, which is called the target aircraft, and the Interval Management (IM) aircraft. The target aircraft is the one to be followed by the IM aircraft 10 an example of which is illustrated in FIG. 1. The target aircraft requires no special equipage or method of control. The IM aircraft 10 is responsible for achieving and maintaining the separation between the target aircraft and itself. Thus, the IM aircraft 10 must be outfitted for this task.

It will thus be understood that the IM aircraft 10 provides an environment for implementation of the described AIM functions. More specifically, for this implementation, the AIM functionality will be implemented in the FMS 8 (FIG. 2) on the IM aircraft 10. The IM aircraft 10 can include one or more propulsion engines 12 coupled to a fuselage 14. A cockpit 16 can be positioned in the fuselage 14 and wing assemblies 18 can extend outwardly from the fuselage 14. Further, a set of aircraft systems 20 that enable proper operation of the IM aircraft 10 can be included as well as one or more controllers or computers 22 22, and a communication system having a communication link 24. While a commercial aircraft has been illustrated, it is contemplated that embodiments of the invention can be used in any type of aircraft, for example, without limitation, fixed-wing, rotating-wing, rocket, personal aircraft, Unmanned Aerial Systems (UASs), and military aircraft.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward means upstream and aft/rearward means downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

Furthermore, as used herein, the term "set" or a "set" of elements can be any number of elements, including only one.

Additionally, as used herein, a "controller" or "controller module" can include a component configured or adapted to provide instruction, control, operation, or any form of communication for operable components to effect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transition, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order, and relative sizes reflected in the drawings attached hereto can vary.

The set of aircraft systems 20 can reside within the cockpit 16, within the electronics and equipment bay (not shown), or in other locations throughout the IM aircraft 10 including that they can be associated with the engines 12. Such aircraft systems 20 can include but are not limited to an electrical system, an oxygen system, hydraulics or pneumatics system, a fuel system, a propulsion system, flight controls, audio/video systems, an Integrated Vehicle Health Management (IVHM) system, and systems associated with the mechanical structure of the IM aircraft 10.

Figure 2:
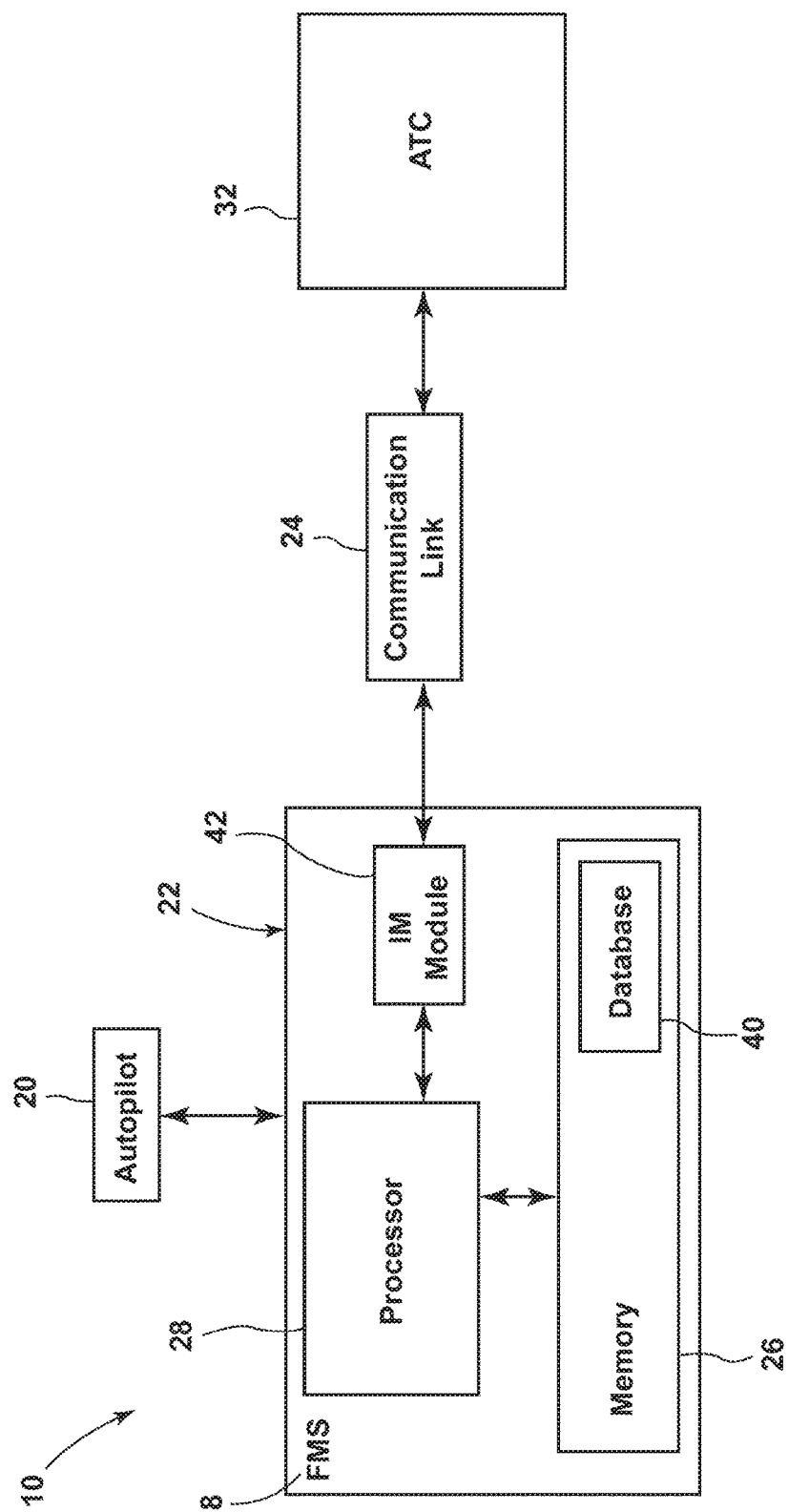
FIG. 2 is a block diagram of an interval management system that can be utilized with the aircraft and ground system of FIG. 1.

The computer 22, which will be understood to be the FMS 8 (FIG. 2), can be operably coupled to the set of aircraft systems 20 and can aid in operating the set of aircraft systems 20 and can receive information from the set of aircraft systems 20 and the communication link 24. The computer 22 can, among other things, automate the tasks of piloting and tracking the flight plan of the IM aircraft 10. The computer 22 can also be connected with other controllers or computers of the IM aircraft 10 including the FMS 8, can be a portion of the FMS 8, or the FMS 8 can be a portion of the computer 22 (FIG. 2). It will be understood that the FMS 8 can be a larger system than that illustrated and that the drawings are merely for illustrative purposes only.

The computer 22 can include memory 26, the memory 26 can include Random Access Memory (RAM), Read-Only Memory (ROM), flash memory, or one or more different types of portable electronic memory, such as discs, DVDs, CD-ROMs, etc., or any suitable combination of these types of memory. The computer 22 can include one or more processors 28, which can be running any suitable programs. It will be understood that the computer 22 can include or be associated with any suitable number of individual microprocessors, power supplies, storage devices, interface cards, auto flight systems, flight management computers, and other standard components and that the computer 22 can include or cooperate with any number of software programs (e.g., flight management programs) or instructions designed to carry out the various methods, process tasks, calculations, and control/display functions necessary for operation of the IM aircraft 10.

The communication link 24 can be communicably coupled to the computer 22 or other processors of the aircraft to transfer information to and from the IM aircraft 10. It is contemplated that the communication link 24 can be a wireless communication link and can be any variety of communication mechanism capable of wirelessly linking with other systems and devices and can include, but is not limited to, satellite uplink, SATCOM internet, VHF Data Link (VDL), ACARS network, Aeronautical Telecommunication Network (ATN), Automatic Dependent Surveillance-Broadcast (ADS-B), Wireless Fidelity (WiFi), WiMax, 3G wireless signal, Code Division Multiple Access (CDMA) wireless signal, Global System for Mobile communication (GSM), 4G wireless signal, Long Term Evolution (LTE) signal, or any combinations thereof. It will also be understood that the particular type or mode of wireless communication is not critical to embodiments of this invention, and later-developed wireless networks are certainly contemplated as within the scope of embodiments of this invention. Further, the communication link 24 can be communicably coupled with the computer 22 through a wired link without changing the scope of embodiments of this invention. Although only one communication link 24 has been illustrated, it is contemplated that the IM aircraft 10 can have multiple communication links communicably coupled with the computer 22. Such multiple communication links can provide the IM aircraft 10 with the ability to transfer information to or from the IM aircraft 10 in a variety of ways.

As illustrated, the computer 22 can communicate with a designated ground station 32 via the communication link 24. The ground station 32 can be any type of communicating ground station 32 such as one operated by an Air Service Navigation Provider (ANSP) and/or Air Traffic Control (ATC). The computer 22 can request and receive information from the designated ground station 32 or the designated ground station 32 can send a transmission to the IM aircraft 10.

As illustrated more clearly in FIG. 2, the computer 22 can form a portion of the FMS 8 or the FMS 8 can form a portion of the computer 22. In the illustrated example, a database component 40 is illustrated as being included in the memory 26. It will be understood that the database component 40 can be any suitable database, including a single database having multiple sets of data, multiple discrete databases linked together, or even a simple table of data. It is contemplated that the database component 40 can incorporate a number of databases or that the database can actually be a number of separate databases. The database component 40 can be a Navigation Database (NDB) containing information including, but not limited to, airports, runways, airways, waypoints, terminal areas, navigational aids, airline/company-specific routes, and procedures such as Standard Instrument Departure (SID), and Standard Terminal Approach Routes (STAR). The database component 40 can alternatively include memory in the FMS containing a flight plan.

While not illustrated it will be understood that any number of sensors or other systems can also be communicatively or operably coupled to the computer 22 to provide information thereto or receive information therefrom. By way of non-limiting example, a navigation system including a GNSS receiver configured to provide data that is typical of GPS systems, such as the coordinates of the IM aircraft 10 can be coupled with the computer 22 or the IM module 42. Position estimates provided by the GNSS receiver can be replaced or augmented to enhance accuracy and stability by inputs from other sensors, such as inertial systems, camera and optical sensors, and Radio Frequency (RF) systems (none of which are shown for the sake of clarity). Such navigation data may be utilized by the IM module 42 and the FMS 8 for various functions, such as to navigate to a target position.

Further still, an autopilot system can be included as one of the systems 20 and is specifically illustrated as being operably coupled to the FMS 8. It will be understood that the FMS 8 can provide the flight procedure information such as waypoints and speed to other systems in the IM aircraft 10 including, but not limited to, the illustrated autopilot system 20.

It will be understood that details of environments that can implement embodiments of the invention are set forth in order to provide a thorough understanding of the technology described herein. It will be evident to one skilled in the art, however, that the exemplary embodiments can be practiced without these specific details. The exemplary embodiments are described with reference to the drawings. These drawings illustrate certain details of specific embodiments that implement a module or method, or computer program product described herein. However, the drawings should not be construed as imposing any limitations that can be present in the drawings. The method and computer program product can be provided on any machine-readable media for accomplishing their operations. The embodiments can be implemented using an existing computer processor, or by a special purpose computer processor incorporated for this or another purpose, or by a hardwired system.

For example, while a separate IM module 42 is illustrated and described for illustrative purposes it will be understood that the functionality of the IM module 42 can merely me be executable language within the FMS 8 or the computer 22. It will be understood that the interval management function could be an application running on the same computer 22 as the FMS or could be a partition of the FMS application. The computer can either be a single Line-Replaceable Unit (LRU) or a collection of processor cards (e.g. Integrated Modular Avionics (IMA)). The IM module 42 along with other aspects can include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired and wireless) to a machine, the machine properly views the connection as a machine-readable medium. Thus, any such connection is properly termed a machine-readable medium. Combinations of the above are also included within the scope of machine-readable media. Machine-executable instructions include, but are not limited to, instructions and data, which cause a general-purpose computer, special purpose computer, or special purpose processing machines to perform a certain function or group of functions.

Embodiments will be described in the general context of method steps that can be implemented in one embodiment by a program product including machine-executable instructions, such as program codes, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

Embodiments can be practiced in a networked environment using logical connections to one or more remote computers having processors. Logical connections can include a Local Area Network (LAN) and a Wide Area Network (WAN) that are presented here by way of example and not limitation. Such networking environments are commonplace in office-wide or enterprise-wide computer networks, intranets and the internet and can use a wide variety of different communication protocols. Those skilled in the art will appreciate that such network computing environments will typically encompass many types of computer system configurations, including Electronic Flight Bags (EFBs), personal computers, hand-held devices, multiprocessor systems, microprocessor-based or programmable consumer electronics, network PCs, minicomputers, mainframe computers, and the like.

Embodiments can also be practiced in distributed computing environments where tasks are performed by local and remote processing devices that are linked (either by hardwired links, wireless links, or by a combination of hardwired and wireless links) through a communication network. In a distributed computing environment, program modules can be located in both local and remote memory storage devices.

Figure 3:
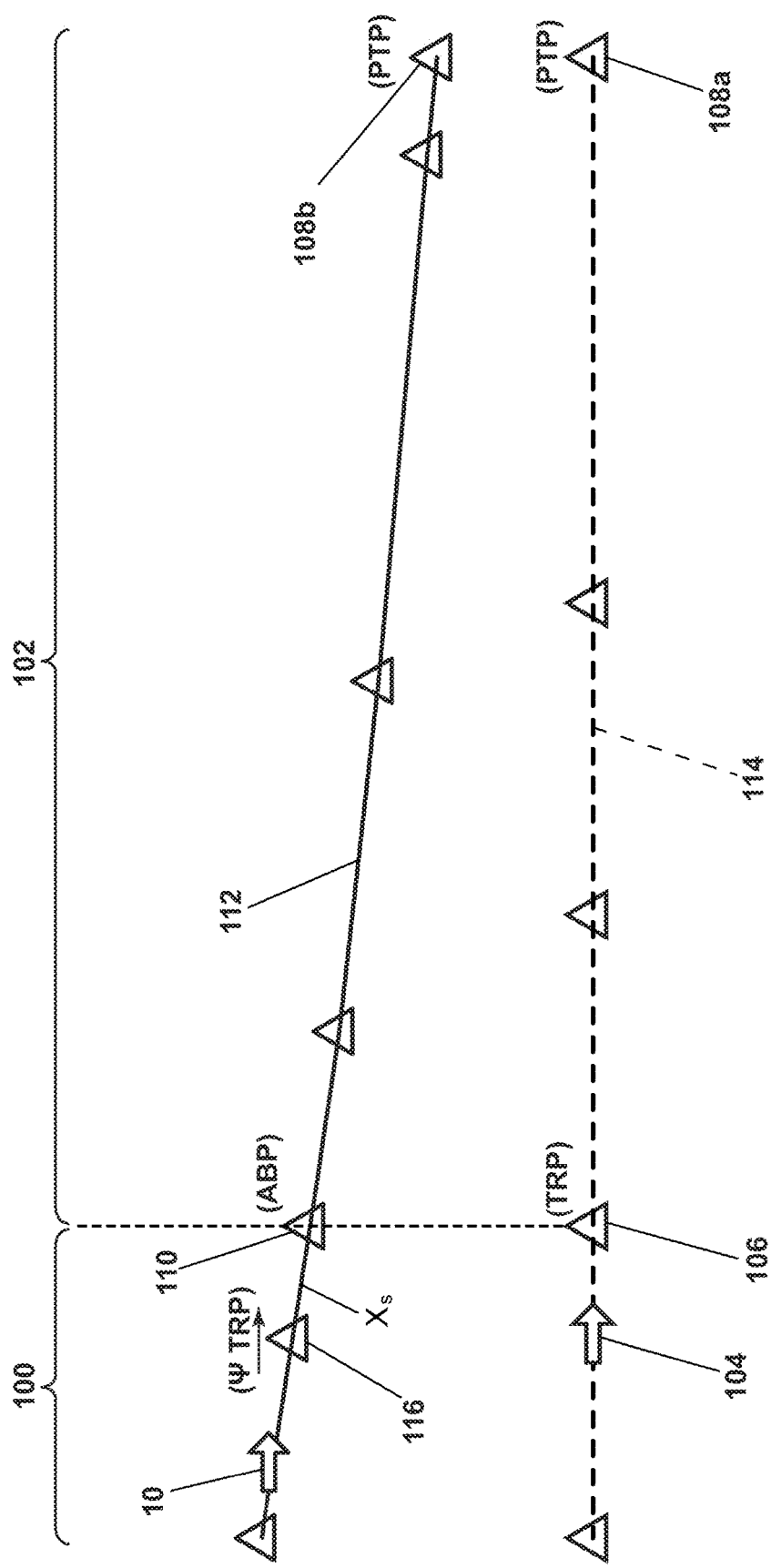
FIG. 3 is a schematic diagram of a flight plan of a target aircraft and an interval management aircraft like the aircraft of FIG. 1.

The IM module 42 is adapted to determine AIM functions and automatically fly the IM aircraft 10 to maneuver in accordance therewith. The FMS 8 therefore is configured to determine and provide guidance to the IM aircraft 10 to both initially achieve the ATC requested distance or time separation and then maintain that separation. The AIM function can be broken into two distinct phases, the achieve stage 100 and the maintain stage 102 as shown in FIG. 3.

The achieve stage 100 occurs from the time that the IM aircraft 10 receives its IM instructions from ATC such as from the designated ground stations 32, until the target aircraft 104 reaches a Target Reference Point (TRP) 106. During the achieve stage 100, the goal for the IM aircraft 10 is to achieve the requested time separation or distance separation from the target aircraft 104, which is in the lead by the time the target aircraft 104 reaches the TRP 106. It will be understood that the TRP 106 can be a waypoint defined by ATC.

From the time (or distance) that the target aircraft 104 is at the TRP 106, until the time (or distance) that the IM aircraft 10 reaches the Planned Termination Point (PTP) 108b, the IM aircraft 10 is in the maintain stage 102. During the maintain stage 102, the IM aircraft 10 is expected to maintain a fixed time separation or distance separation between itself and the abeam points of the target aircraft 104 projected on the IM aircraft's planned path 112. The requested separation must be maintained until the IM aircraft 10 reaches the PTP 108*b*.

More specifically, a planned path 112 for the IM aircraft 10 is illustrated as well as a planned path 114 for the target aircraft 104. The achieve-by-point (ABP) 110 is the point on the IM trajectory that is "abeam" the TRP waypoint 106 on the IM aircraft's planned path 112. It will be understood that the FMS 8 (FIG. 2) can include an abeam function that is adapted to determine or create such abeam waypoints. ABP01, illustrated at 116, defines the position at which the IM aircraft 10 must be when the target aircraft 104 reaches the TRP waypoint 106 to achieve the requested time separation ($t_s$) or distance separation ($d_s$). By definition, the time separation between ABP01 116 and ABP 110 is $t_s$ and the distance separation between ABP01 116 and ABP 110 is $d_s$. Because the current aspects of the disclosure can be based on either distance or time an $x_s$ reference numeral is utilized in FIG. 3 to refer to both time separation and distance separation.

On the planned path 112 for the IM aircraft 10 it is contemplated that only the PTP 108*b* is provided by ATC. The remainder of the waypoints on the planned path 112 of the IM aircraft 10 can be determined by the FMS 8, either by the abeam function based on time and distance separation requirements from waypoints on the planned path 114 for the target aircraft 104 or from its own flight plan 112. It is contemplated that the TRP 106 will also be an ATC provided waypoint.

For the maintain stage 102, the IM aircraft 10 is expected to maintain a fixed time separation or distance separation between itself and the abeam point of the target aircraft 104 projected on the IM aircraft's planned path 112. The IM aircraft 10 is required to maintain this separation from the target aircraft 104 reaching the TRP 106 until the IM aircraft 10 reaches the PTP 108*b*.

In both the achieve stage 100 and the maintain stage 102, the IM aircraft 10 is required to maintain the requested separation time to ±5% or 2 seconds, whichever is greater for time separations. In the both the achieve stage 100 and the maintain stage 102, the IM aircraft is required to maintain the requested separation distance to ±5% or 0.11 NM, whichever is greater for distance separations.

Figure 4:
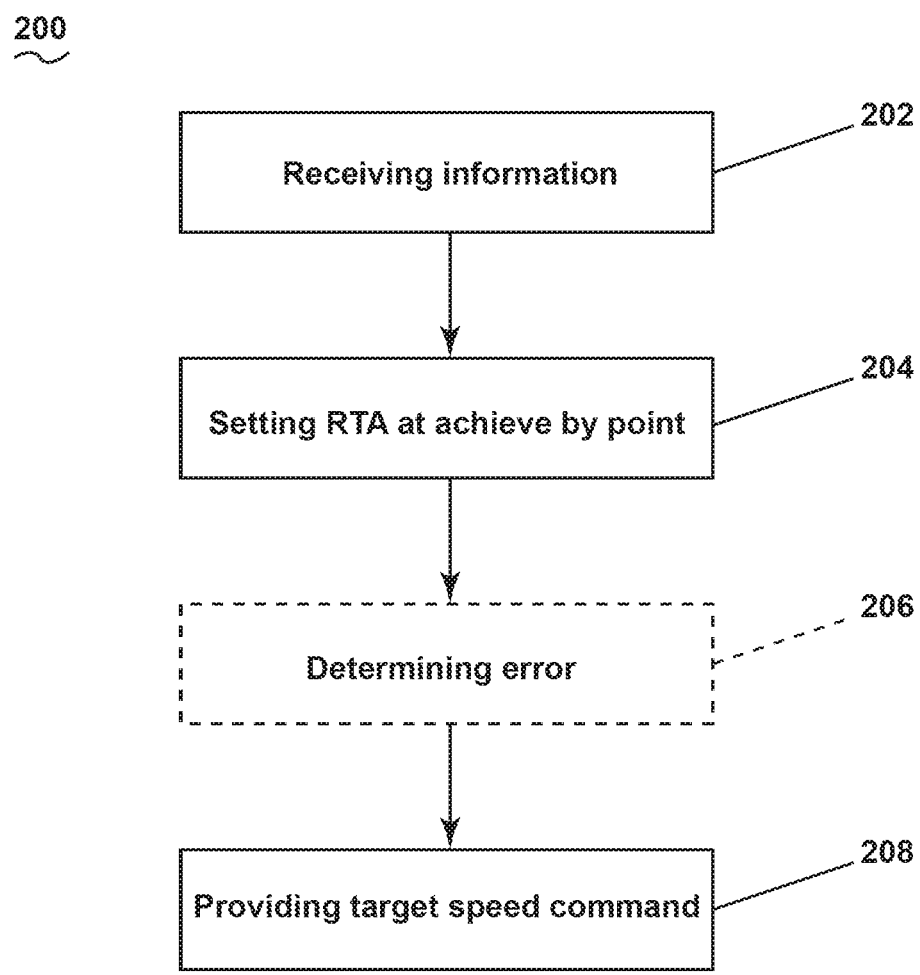
FIG. 4 is a flowchart showing a method of controlling interval management of an aircraft via an interval management system, such as illustrated in FIG. 2.

FIG. 4 illustrates a method 200 for operating an aircraft, such as the aircraft 10. The method can begin by receiving information at 202. Among other things, the IM aircraft 10 receives information, at 202, regarding the target aircraft 104. This can include routing data, flight plan information including all or a portion of the flight plan, speeds, etc. It is contemplated that the IM aircraft 10, at 202, can receive or actively obtain information via any suitable communication link 24. In one non-limiting example, the IM aircraft 10 can receive a communication from the ATC including a UM352 message from the ATC, which contains an (Interval Spacing Approach, Arrival, Cruise, and Departure) IMAACD clearance message.

An example of the Target Aircraft Routing data in the IMAACD Clearance message is defined in Table 1 below:

TABLE 1

| Message Information | | | | | | |
|---|---|---|---|---|---|---|
| Waypoint # | Latitude | Longitude | Flight Level | Waypoint ID | Speed | ETA |
| 1 | $\lambda_1$ | $\Lambda_1$ | $H_1$ | $ID_1$ | $V_1$ | $T_1$ |
| 2 | $\lambda_2$ | $\Lambda_2$ | $H_2$ | $ID_2$ | $V_2$ | $T_2$ |
| 3 | $\lambda_3$ | $\Lambda_3$ | $H_3$ | $ID_3$ | $V_3$ | $T_3$ |
| ... | ... | ... | ... | ... | ... | ... |
| 128 | $\lambda_{128}$ | $\Lambda_{128}$ | $H_{128}$ | $ID_{128}$ | $V_{128}$ | $T_{128}$ |

TABLE 1-continued

Where $\lambda_i$ is the latitude at waypoint i, $\Lambda_i$ is the longitude at waypoint i, $H_i$ is the flight level at waypoint i, $ID_i$ is the waypoint i identifier, $V_i$ is the speed for the leg into waypoint i, and $T_i$ is the estimated time of arrival at waypoint i. It is contemplated that the target aircraft loads up to the next 128 waypoints and provides them to the ATC, such as at the designated ground station 32. This data is then included in the IMAACD Clearance message uplinked from ATC, such as at the designated ground station 32 to the IM aircraft 10 via the communication link 24. Such information can then be accessed by the FMS 8 or the computer 22. By way of further non-limiting examples, data received, at 202, can also include Latitude and Longitude of the target aircraft 104 (FIG. 3) ($\lambda_{TGT}$, $\Lambda_{TGT}$) such as from the ADS/B-In.

At 204, the method 200 includes setting a required time of arrival (RTA) at the ABP01 116. It will be understood that this can initially include the IM module 42 or the FMS 8 creating the waypoint at the ABP01 116 and then setting the RTA at that waypoint.

If a separation time is given ($t_s$) then the RTA at the ABP should be the time of arrival of the target aircraft at the TRP 106 plus or minus error tolerance of the FMS. The error tolerance of the FMS can be any suitable time including up to 60 seconds and including 2 seconds, which will be utilized for exemplary purposes. So, if the target aircraft 104 will be at the TRP 106 in 7 seconds then the RTA will also be 7 seconds. However, it will be understood that this may actually be achieved between 5-9 seconds (i.e. +/−2 seconds). It will be understood that the TRP can be specified as one of the target aircraft's upcoming waypoints and can be any suitable waypoint in the future. In such an instance the Estimated Time of Arrival (ETA) is provided with that waypoint and no calculation is needed.

It is contemplated that the RTA can be repeatedly adjusted based on the projected time the target aircraft will reach the ABP. By way of non-limiting example, the RTA could change significantly due to unpredicted winds. It will be understood that the RTA being repeatedly adjusted could include being continuously adjusted.

The TRP can also be specified by ATC as a distance ($d_{TRP}$) away from one of the target aircraft's upcoming waypoints, $ID_{TRP}$. In this case, the FMS 8 or computer 22 would find the waypoint that matches or is referenced (whose identifier is L), i.e., the first waypoint after the TRP if the distance from the waypoint is a before distance, and the first waypoint before the TRP if the distance is an after distance.

The ETA at the TRP waypoint can be calculated based on a known velocity of the target aircraft 104 by one of the following equations (1) or (2). If $d_{TRP}$ is a before distance then equation (1) is used:

$$t_{tgt\_TRP} = T_L - d_{TRP} * V_L \qquad (1)$$

If $d_{TRP}$ is an after a waypoint distance, then equation (2) is used:

$$t_{tgt\_TRP} = T_L + d_{TRP} * V_{L+1} \qquad (2)$$

Again, it will be understood that any of the abeam waypoints including ABP01 can be created using the Abeam function, the Fix function and the Track Angle function in the FMS 8. The Abeam function calculates the abeam point (ABP) by finding the point on the IM trajectory that is abeam the TRP waypoint 106 on the planned path 112. The Fix function finds ABP01 by calculating the position of ABP01 as the waypoint a distance ($d_{TRP}$) and track angle ($\psi_{TRP}$) from waypoint ABP. $\psi_{TRP}$ is found using the FMS Track Angle function to calculate the track angle between waypoint $I_{DI}$ and $I_{DI+1}$ if $d_{TRP}$ is an after distance, or between $I_{DI-1}$ and $I_{DI}$ if $d_{TRP}$ is a before distance. Once these determinations or calculations are made, then the RTA function of the IM module 42 or the FMS 8 can be engaged at waypoint ABP01 116 with the required time of arrival set as described at 204

The FMS 8 then functions to maintain the time or distance separation for the maintain stage 102 (FIG. 3). Appropriate speed commands can be set at 208 and any errors can be accounted for at 206. Aspects of distance and time separation will be described separately.

Distance Separation

For the maintain stage 102 the IM aircraft 10 can alternatively be expected to maintain a fixed distance separation between itself and the target aircraft 104. If the IM aircraft 10 arrives at the ABP01 116 at the correct distance separation, then to maintain the correct separation distance ($d_s$), the IM aircraft 10 would only have to match the speed of the target aircraft 104. The speed of the target aircraft 104 can be determined from its predicted trajectory speed data ($V_t$) from the routing information giving the intent of the target aircraft 104. To maintain the separation, a target speed command can be provided, at 208, to IM aircraft 10. More specifically, the commanded speed of the IM Aircraft 10 ($V_{IM\_cmd}$) would be set to the speed that the target aircraft ($V_{TGT}$) was at when it was the same distance from the PTP 108*a*. It will be understood that referenced speeds can be either ground speeds or air speeds.

However, it is contemplated that there will be some distance separation error ($d_e$). In such an instance, a delta speed command proportional to $d_e$ can be included. To prevent overshoot and oscillation around the desired result a derivative control can be used. Due to the accuracy of position and distance inputs, the delta speed command is not used when the distance separation error is within a predetermined threshold, such as by way of non-limiting example +/−1,000 feet.

Given the current position such as the latitude and longitude, of the IM aircraft ($\lambda_{IM}$, $\Lambda_{IM}$) and the target aircraft ($\lambda_{TGT}$, $\Lambda_{TGT}$), as received at 202, the Abeam function of the FMS 8 can be utilized to locate the abeam point of the target aircraft, abeam of the target aircraft flight path on the IM aircraft flight path 112. The Distance utility of the FMS 8 can then be used to find the distance between the IM aircraft 10 and abeam point calculated above.

Figure 5:
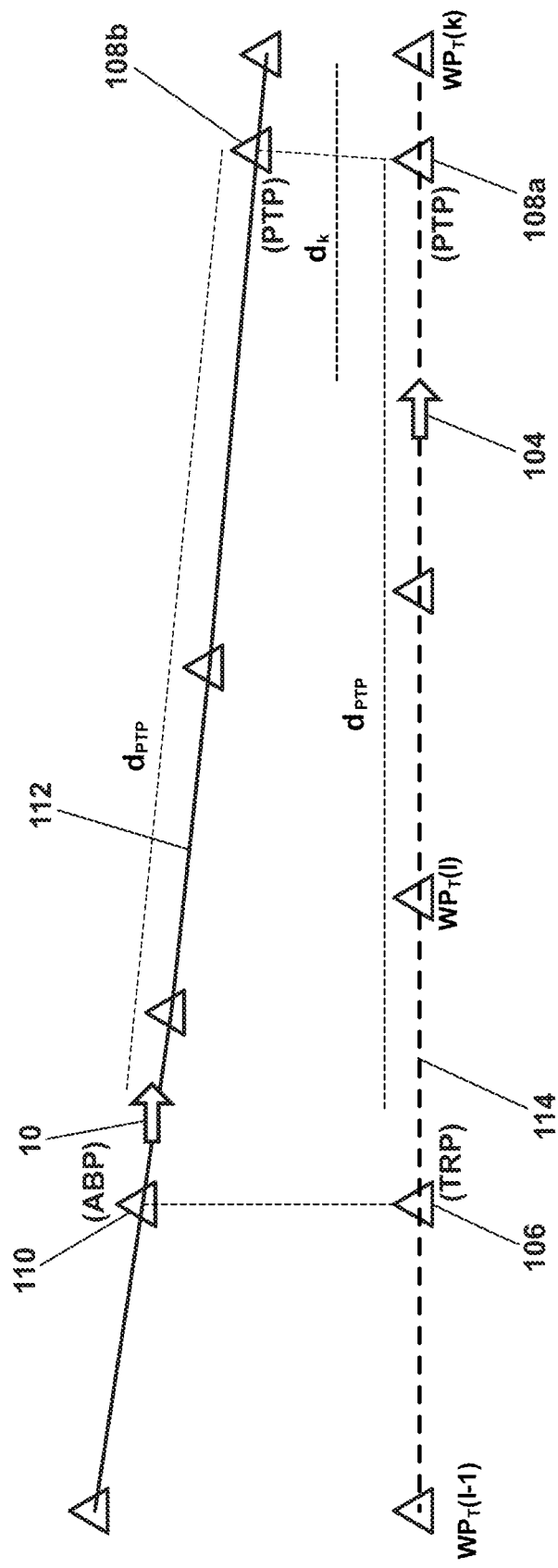
FIG. 5 is a schematic diagram of the target aircraft and the interval management aircraft of FIG. 3 along with speed references.

Referring to FIG. 5, to find the estimated speed of the target ($V_{TGT}$) at the current time (t); first you find the distance along the IM aircraft's planned path 112 from the IM aircraft 10 to the PTP 108*b*, this is defined in FIG. 5 as drip. From the IM aircraft FMS flight plan, the distance to go to the To waypoint using the FMS Distance to Go function, and the distance to each waypoint up to and including the PTP waypoint 108*b* can be found. $d_{PTP}$ is the sum of those distances. The location of the PTP 108*a* on the target aircraft path 114 can be calculated. This is done using the FMS Abeam function to find the point on the target aircraft flight plan that is on a line perpendicular from the IM aircraft flight plan, with the perpendicular line starting at PTP 108*b*. Then, going backwards in the target aircraft flight plan 114 from the EPP data (ADS-C Extended Projected Profile) received at 202; from PTP 108*a*, find $WP_T(l)$ such that the point along the target aircraft flight plan 114, a distance $d_s$ backwards from $PTP_T$, is between $WP_T(l-1)$ and $WP_T(l)$ according to equation (3):

$$d_s = d_{PTP} - t_s * v \tag{3}$$

Where v is the ground speed of the IM aircraft 10 and the speed at $WP_T(l)$ is the target speed, $V_{TGT}$ and target speed commands can be provided appropriately at 208 by the FMS 8.

It will be understood that the method 200 is flexible and the method 200 is illustrated merely for illustrative purposes. For example, the sequence of steps depicted is for illustrative purposes only, and is not meant to limit the method 200 in any way, as it is understood that the steps can proceed in a different logical order or additional or intervening steps can be included without detracting from embodiments of the invention. By way of non-limiting example, for the maintain stage 102 the IM aircraft 10 can alternatively be expected to maintain a fixed time separation between itself and the target aircraft 104.

Time Separation

If the IM aircraft 10 arrives at the ABP01 116 at the correct time, then to maintain the correct separation time ($t_s$), the IM aircraft 10 would only have to match the speed of the target aircraft 104. It will be understood that the term speed as used herein is a ground speed. The speed of the target aircraft 104 can be determined from its predicted trajectory speed data ($V_t$) from the routing information as received at 202. To maintain the separation, the commanded speed of the IM aircraft ($V_{IM\_cmd}$) is set at 208 to a speed that the target aircraft ($V_{TGT}$) was at when it was the same distance from the PTP 108*a*.

However, it is contemplated that there will be some time separation error ($t_e$). The time separation error will be caused by the target aircraft 104 being either ahead or behind its schedule, i.e. ahead or behind the ETA given in the EPP data or information received at 202. To eliminate the time separation error, a delta speed command can be provided.

To calculate the time error, such as at 206, first the distance from the target aircraft to $WP_T(k)$ must be determined and this distance is $d_k$ (FIG. 5). Using the data received at 202, the ETA at the target aircraft is as shown in equation (4).

$$ETA_T = ETA(k) - d_k / V(k) \tag{4}$$

Then the time error is calculated as in equation (5):

$$d_e = ETA_T - t \tag{5}$$

where t is the current time.

Technical effects of the above-described embodiments include that interval management can be implemented by an FMS. Aspects of the present disclosure make use of FMS functions such as FMS RTA, FMS Fix, FMS Track Angle, FMS Abeam, FMS Distance and FMS Distance-To-Go functions as well as data from predicted trajectory and speeds based on waypoint information so that the need for a separate interval management computer or flight manager is eliminated. While the functions could be hosted on alternative systems, such systems would then have to implement many of the same FMS functions, which would be redundant. Further still, aspects of the present disclosure vastly expand previous interval management solutions that were previously restricted to co-incident and parallel/equidistance paths to include the ability to maintain interval management for non-coincident but converging and parallel/ non-equidistance paths. Further still technical and commercial advantages arise in that by implementing the solutions in the FMS, many of the calculations needed are available already in the FMS and are implemented in "flight certified" code, making the implementation of the interval management software much less expensive to implement. The FMS is already certified to communicate speed targets to the autopilot and autothrottle; whereas other systems with a lower Design Assurance Level (DAL) would require updates to those systems to put (hazard) mitigations in place if such functions were included. Further still, the above aspects can be utilized for more than just a single pair of aircraft. It will also be understood that the FMS will be able to help with energy management of an aircraft.

To the extent not already described, the different features and structures of the various embodiments can be used in combination with each other as desired. That one feature is not illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

Various characteristics, aspects and advantages of the present disclosure may also be embodied in any permutation of aspects of the disclosure, including but not limited to the following technical solutions as defined in the enumerated aspects:

1. A method of controlling a following aircraft in reference to a target aircraft, the method comprising:
receiving, in a flight management system of the following aircraft, information related to the target aircraft;
setting a required time of arrival at an achieve-by-point abeam of a target aircraft target reference point; and
after the achieve-by-point is reached, flying the following aircraft to maintain a fixed separation between the following aircraft and the target aircraft.

2. The method of aspect 1 wherein the information related to the target aircraft includes target aircraft routing data.

3. The method of aspect 2 wherein the target aircraft routing data is an IMAACD clearance message or information obtained therefrom.

4. The method of aspect 3 wherein the receiving further comprises receiving target latitude and target longitude from an ADS-B In.

5. The method of aspect 1 wherein the flight management system includes a required time of arrival function that is automatically engaged to provide the requested separation at the achieve-by-point abeam of the target aircraft target reference point.

6. The method of aspect 5 wherein the target aircraft target reference point is a distance away from an upcoming waypoint of the target aircraft.

7. The method of aspect 6, further comprising determining an estimated time of arrival of the target aircraft at the target aircraft target reference point.

8. The method of aspect 7 where setting the required time of arrival is automatically set based on the estimated time of arrival.

9. The method of aspect 1, further comprising of determining the achieve-by-point abeam of the target aircraft target reference point based on a specified distance separation.

10. The method of aspect 9 wherein the distance separation error is no more than the greater of 5% of the requested separation distance or 0.11 nautical miles.

11. The method of aspect 9 wherein flying the following aircraft further comprises setting a commanded speed to a speed that the target aircraft was at when it was the same distance from a planned termination point with adjustments for any separation error.

12. The method of aspect 1, further comprising determining the achieve-by-point abeam of the target aircraft target reference point based on a specified time separation.

13. The method of aspect 12 wherein the time separation error is no more than the greater of 5% of the requested separation time or 2 seconds.

14. The method of aspect 12 wherein flying the following aircraft further comprises setting a commanded speed to a speed that the target aircraft was at when it was the same distance from a planned termination point with adjustments for any separation error.

15. An aircraft, comprising:
a communication link; and
a flight management system that is communicably coupled to the communication link, and includes an interval management module configured to receive information related to a target aircraft and automatically achieve an initial separation with a target aircraft and maintain a predetermined separation with the target aircraft until a planned termination point is reached.

16. The aircraft of aspect 15 wherein the information related to the target aircraft includes waypoint and speed information related to the target aircraft for a predetermined number of waypoints along a predetermined flight path.

17. The aircraft of aspect 15 wherein the flight management system further comprises at least two functions from a group including: a required time of arrival function, a fix function, a track angle function, an abeam function, a distance function, and a distance-to-go function.

18. The aircraft of aspect 17 wherein the flight management system utilizes the at least two functions to automatically set a required time of arrival at an achieve-by-point abeam of a target aircraft target reference point to achieve the initial separation and flying the following aircraft to maintain a fixed separation between the following aircraft and the target aircraft to maintain the predetermined separation.

19. The aircraft of aspect 18 wherein the flight management system is further adapted to a speed command to account for a time separation error or a distance separation error.

20. The aircraft of aspect 17 wherein the flight management system includes a required time of arrival function, a fix function, a track angle function, an abeam function, a distance function, and a distance-to-go function.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of controlling a following aircraft, operating according to a following aircraft planned path, in reference to a target aircraft, operating according to a target aircraft planned path, the method comprising:

receiving, in a flight management system of the following aircraft, information regarding the target aircraft;

setting, in the flight management system, a required time of arrival at an achieve-by-point provided on the following aircraft planned path wherein the achieve-by-point is abeam a target reference point provided on the target aircraft planned path;

engaging, in the flight management system, a required time of arrival function and enabling flight of the following aircraft, according to the required time of arrival function, to reach the achieve-by-point by the required time of arrival; and after the achieve-by-point is reached by the following aircraft, maintaining a fixed separation between the following aircraft and the target aircraft.

2. The method of claim 1 wherein the information related to the target aircraft includes target aircraft routing data.

3. The method of claim 2 wherein the target aircraft routing data is an IMAACD clearance message or information obtained therefrom.

4. The method of claim 3 wherein the receiving further comprises receiving target latitude and target longitude from an ADS-B In.

5. The method of claim 1 wherein the flight management system includes the required time of arrival function that is automatically engaged to provide a requested separation distance at the achieve-by-point abeam of the target aircraft target reference point.

6. The method of claim 5 wherein the target aircraft target reference point is a distance away from an upcoming waypoint of the target aircraft.

7. The method of claim 6, further comprising determining an estimated time of arrival of the target aircraft at the target aircraft target reference point.

8. The method of claim 7 where setting the required time of arrival is automatically set based on the estimated time of arrival.

9. The method of claim 1, further comprising determining the achieve-by-point abeam of the target aircraft target reference point based on a requested distance separation.

10. The method of claim 9 wherein a distance separation error is no more than the greater of 5% of the requested distance separation or 0.11 nautical miles.

11. The method of claim 9 wherein flying the following aircraft further comprises setting a commanded speed to a speed that the target aircraft was at when it was the same distance from a planned termination point with adjustments for any separation error.

12. The method of claim 1, further comprising determining the achieve-by-point abeam of the target aircraft target reference point based on a requested time separation.

13. The method of claim 12 wherein a time separation error is no more than the greater of 5% of a requested separation time or 2 seconds.

14. The method of claim 12 wherein flying the following aircraft further comprises setting a commanded speed to a speed that the target aircraft was at when it was the same distance from a planned termination point with adjustments for any separation error.

15. An aircraft operating according to an aircraft planned path, comprising:

a communication link; and a flight management system that is communicably coupled to the communication link, and includes an interval management module configured to receive information related to a target aircraft and automatically achieve an initial separation with a target aircraft, operating according to a target aircraft planned path, and maintain a predetermined separation with the target aircraft until a planned termination point is reached;

wherein the flight management system of the aircraft comprises an abeam function configured to generate at least one achieve-by-point along the aircraft planned path that is abeam a target reference point provided on the target aircraft planned path, wherein the achieve-by-point is a point on the aircraft planned path that is normal to the target reference point on the target aircraft planned path; and wherein the flight management system utilizes a required time of arrival function to set a required time of arrival at the at least one achieve-by-point, and wherein the flight management system can engage the required time of arrival function to enable flight of the following aircraft, according to the required time of arrival function, to the achieve-by-point by the required time of arrival.

16. The aircraft of claim 15 wherein the information related to the target aircraft includes waypoint and speed information related to the target aircraft for a predetermined number of waypoints along a predetermined flight path.

17. The aircraft of claim 15 wherein the flight management system further comprises at least two functions from a group including: the required time of arrival function, a fix function, a track angle function, the abeam function, a distance function, and a distance-to-go function.

18. The aircraft of claim 17 wherein the flight management system includes the required time of arrival function, the fix function, the track angle function, the abeam function, the distance function, and the distance-to-go function.

19. The aircraft of claim 17 wherein the flight management system utilizes the at least two functions to automatically set the required time of arrival at an achieve-by-point abeam of a target aircraft target reference point to achieve the initial separation and flying the following aircraft to maintain a fixed separation between the following aircraft and the target aircraft to maintain the predetermined separation.

20. The aircraft of claim 19 wherein the flight management system is further adapted to a speed command to account for a time separation error or a distance separation error.

* * * * *